United States Patent
Le Pezennec et al.

(10) Patent No.: US 9,496,612 B2
(45) Date of Patent: Nov. 15, 2016

(54) SYSTEM AND METHOD FOR ENHANCED TRANSMISSION IN MOBILE COMMUNICATION NETWORKS USING AN ACTIVE ANTENNA ARRANGEMENT

(71) Applicant: VODAFONE IP LICENSING LIMITED, Newbury, Berkshire (GB)

(72) Inventors: Yannick Le Pezennec, Madrid (ES); Javier Lopez Roman, Madrid (GB); Brendan McWilliams, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 846 days.

(21) Appl. No.: 13/725,629

(22) Filed: Dec. 21, 2012

(65) Prior Publication Data

US 2013/0181868 A1    Jul. 18, 2013

(30) Foreign Application Priority Data

Jan. 2, 2012    (ES) .................................. 201230002

(51) Int. Cl.
    *H01Q 3/36*     (2006.01)
    *H04B 7/04*     (2006.01)
    *H04B 7/06*     (2006.01)
    *H04B 17/12*    (2015.01)
    *H04B 7/10*     (2006.01)

(52) U.S. Cl.
    CPC .............. *H01Q 3/36* (2013.01); *H04B 7/0465* (2013.01); *H04B 7/0473* (2013.01); *H04B 7/0632* (2013.01); *H04B 7/0689* (2013.01); *H04B 17/12* (2015.01); *H04B 7/10* (2013.01)

(58) Field of Classification Search
    CPC .............................. H04B 7/0632; H01Q 3/36
    See application file for complete search history.

(56) References Cited

U.S. PATENT DOCUMENTS

| | | | |
|---|---|---|---|
| 7,391,367 B2 * | 6/2008 | Newberg ............. | H01Q 3/2676 342/375 |
| 2005/0053169 A1 * | 3/2005 | Jia ........................ | H04B 7/0417 375/267 |
| 2010/0316154 A1 * | 12/2010 | Park ...................... | H04B 7/063 375/267 |
| 2011/0122962 A1 * | 5/2011 | De Pasquale .......... | H01Q 3/267 375/267 |

* cited by examiner

*Primary Examiner* — Gregory C Issing
(74) *Attorney, Agent, or Firm* — Workman Nydegger

(57) ABSTRACT

A transmission system and method for use in a mobile communication network comprising an active antenna arrangement of multiple antennas. The active antenna arrangement comprising several pairs of radiofrequency sub-modules each radiofrequency sub-module including a first phase shifter module, a TRX module and a radiating antenna element and where an dynamic phase offset is applied to one of the sub-modules of each pair, and where the phase offset vector is selected according to the signal quality received by users of the mobile communication network using an algorithm which minimizes the duration of the selection process.

20 Claims, 6 Drawing Sheets

SYSTEM AND METHOD FOR ENHANCED TRANSMISSION IN MOBILE COMMUNICATION NETWORKS USING AN ACTIVE ANTENNA ARRANGEMENT

CROSS REFERENCE TO RELATED APPLICATIONS

This application claims priority to Spanish Application Number 201230002, filed on Jan. 2, 2012, the entirety of which is incorporated herein by reference.

FIELD OF THE INVENTION

The present invention relates to wireless communications and more specifically to an enhanced transmission system and method for mobile communication networks.

BACKGROUND OF THE INVENTION

The enhanced transmission system and method proposed in the present invention is especially useful in mobile networks systems using multiple active antennas.

The use of active antennas has improved the performance of the existing telecommunication networks and simplified the deployment of mobile network systems. Moreover the working characteristics of the active antennas allow an improvement of the existing communication methods.

An active antenna is an antenna that contains active electronic components that provide equivalent functionalities to conventional Remote Radio Units (RRU) i.e. containing all necessary Radio Frequency Equipment to ensure the transmission and the reception of 2G, 3G or LTE signals. Typically the active antenna connects to a baseband unit (BBU) by means of a fibre connection. The BBU function can also be integrated in the active antenna with a direct Iub connection as input to the active antenna. This allows the construction of antennas of limited size and/or wide frequency range.

Active antennas are usually made of several RF sub-modules, each one integrating RF transmission and reception functions, the active antenna transmitting/receiving a RF signal by combining the signals of each sub-module, usually synchronously, over the air (this synchronization is obtained and controlled by an active antenna controller element 14). That is, the sub-modules operate together (preferably synchronously) for transmission of radiofrequency signals to users of the mobile communication network. Each sub-module comprises a digitally controlled phase shifter (11) (called "static" phase shifter), so the digital signal which feeds each sub-module is phase shifted independently with respect to other sub-modules, a transceiver (TRX) module (12) and an antenna element (13). The TRX module performs transmission and reception functions including functions such as: low power amplification by low noise amplifiers (LNA) in uplink; multicarrier low to medium power amplification (MCPA) in downlink; up/down conversion; digital to analogue conversion; and filtering functions (for example, duplexer functions, separating the uplink and the downlink frequencies in case of FDD). Each TRX is connected to an antenna element (for example a dipole) to transmit over the air an output signal (usually a low-power output signal) as well as receive signals with similar sensitivity, as in a classical macro/RRH deployment.

FIG. 1 shows an active antenna architecture with N sub-modules (or branches) with the digitally controlled phase shifter (11) controlled by the active antenna controller element (14). These phase shifts (represented as $e^{j \cdot \Phi 1} \ldots e^{j \cdot \Phi N}$, that is, they may be different for each sub-module) are selected as a part of the antenna calibration, that is, the phase shifts (offsets) are selected at the beginning of the antenna operation according to the real working conditions of the antenna (tilt, orientation, . . . ) to achieve proper operation of the antenna. Consequently, the selection of the vector of phase for the N sub-modules is static, that is, the vector of phase is selected (set) at the beginning of the antenna operation and it is fixed (not changed) during the antenna operation, unless a change is needed due to a significant change in the working conditions of the antenna. That is, this phase setting is mainly used for optimization purposes and it is very seldom changed. The antenna tilt settings set through these phase shifters are checked only infrequently (with a check every couple of months, typically) and if it is needed, there is a change in the selected phase shifts. For this reason, the present document characterizes conventional phase shifters as "static" phase shifters: this terminology contrasts with the "adaptive" or "dynamic" phase shifters described later in this document, which typically are changed several times per minute. The intelligence in the active antenna controller to decide which phase vector to apply can either be integrated physically in the active antenna or provided separately in a baseband unit connected (for example, via optical fiber) to the active antenna. However the digital phase shifters can only be located in the active antenna.

The active antenna controller elements control not only the phase shifters but also all the other elements of the different sub-modules (attenuators, filters . . . ) necessary to form the required radiating signal or to receive adequately signals transmitted on the uplink by users.

Another technique frequently used to improve the performance of, for example, 3G wireless networks is the High-Speed Downlink Packet Access HSDPA technology. HSDPA is a packet-based data service in third generation (3G) W-CDMA (Wideband Code Division Multiple Access) systems, which provides high-speed data transmission (with different download rates e.g. 7.2/10.8/16.2/21.6 Mbps over a 5 MHz bandwidth) to support multimedia services.

HSDPA comprises various versions with different data speeds and features. In table 5.1a of the release 9 version of 3GPP TS 25.306, it is shown maximum speeds of different device classes and the combination of features they support.

In order to reach yet higher peak rates (i.e. 28.8 Mbps with 3GPP Release 7), the MIMO (Multiple Input Multiple Output) feature is used in HSDPA.

In MIMO systems, both the transmitter and the receiver are equipped with multiple antennas in order to improve the system performance. In particular, the use of MIMO systems represents a useful solution for improving the capacity and user throughput performance of the networks. The basic MIMO feature as standardised in 3GPP Release 7 is based on two transmitter antennas (at the node B or base station) and two receiving antennas (at the UE) using a single carrier. At the transmitter, the data can be split into one or two data streams and transmitted through the two antennas using the same radio resource (i.e. same transmission time interval and HSDPA codes). In a generic downlink transmitter structure to support MIMO operation the primary and secondary transport blocks are each processed (channel coding and interleaving), then spread and scrambled, subsequently weighted by precoding weights. The resulting channels after MIMO precoding (i.e. MIMO channel#1 and MIMO channel#2) are mapped onto P-CPICH and S-CPICH (Primary and Secondary Common Pilot Channels), respectively before being mapped to the first and second physical antennas respectively. The two streams of data are recovered by the UE from the signals received via its two Rx antennas. Thus, for the MIMO feature to work both the network and the terminals need to be MIMO-enabled. In order to deploy MIMO and transmit two parallel data streams, two power amplifiers are required per sector (one for each of the two antennas). In order not to use an entire carrier for MIMO only (5 MHz), it is more efficient and practical to use the same carrier for MIMO devices as used for non-MIMO devices (e.g. HSDPA legacy terminals).

MIMO technology is an important step in the evolution of HSDPA, as it provides higher data rates in downlink whilst further improving spectrum efficiency. When introducing MIMO in a system, it is indispensable to have two transmission branches (RF chains), including two power amplifiers each one connected to the physical antenna. In order to optimise the usage of the power resource it is highly desirable to balance the power between the two power amplifiers. Whilst MIMO channels are intrinsically perfectly power balanced, all the remaining channels need to be transmitted with equal power by each power amplifier. To this end, two techniques can be used: a first one is the use of transmission diversity (using "Space Time Transmit Diversity" (STTD) for all non-MIMO channels except for the Synchronisation Channel for which "Time Switch Transmit Diversity" (TSTD) is used). Another technique is referred to as Virtual Antenna Mapping (VAM) in this description, and is discussed hereinafter.

A key requirement is to make sure that the technique used to balance power in the non-MIMO channels allows substantially the same performance as would be achieved with the same energy using a single power amplifier. STTD was defined by 3GPP (Release '99) in order to achieve this. However in practice this feature has been found to affect the performance of certain legacy user equipments. In particular, HSDPA UEs with equaliser receivers can be severely impacted. This is due to the time transformation which is performed by STTD, which is ill-adapted to an optimum equalisation process. Some HSDPA devices have been found to deactivate their equaliser for this reason. Field tests have shown that the impact of the use of STTD on the throughput of data received by an HSDPA category 8 device (especially for a type 2 receiver i.e. a single antenna equalizer receiver) is particularly negative under good and medium radio conditions.

Virtual Antenna Mapping (VAM) is an alternative to the use of the STTD technique: VAM is aimed at solving this issue fulfilling above-mentioned requirements. Hence, this technique enables power balancing of the power amplifiers whilst not impacting on the performance of legacy users. The principle of the VAM technique is depicted in FIG. 2. The VAM operation/function 100 can be performed as a baseband function after the mapping onto physical channels for Rel'99 and HSDPA and after precoding for MIMO. The VAM operation/function can also be implemented in logic in a radio unit such as a Remote Radio Head (RRH). The signals shown at the input of adding operations 150, 180 are, for example, the following: Rel'99 refers to the dedicated channel (DCH) which can carry voice or data traffic; HS refers to HSDPA SIMO (Single Input Multiple Output, i.e. HSDPA without MIMO); MIMO Channel #1 (101) is the resulting channel after MIMO precoding operation consisting of the sum of the primary data stream and the secondary data stream weighted with their correspondent weights; and MIMO Channel #2 (102) is the resulting channel after MIMO precoding operation consisting of the sum of the primary data stream and the secondary data stream with their correspondent weights. Said resulting channels after MIMO precoding (i.e. MIMO channel#1 and MIMO channel#2) are mapped (150, 180) onto Primary (103) and Secondary (104) Common Pilot Channels (P-CPICH and S-CPICH)

VAM consists of mapping input signals onto the physical antennas with specific weights for each path. VAM can be seen as a matrix of four weights $\omega_1, \omega_2, \omega_3, \omega_4$ and two adders 110 applied to two input signals fed by "virtual antennas" 160, 170 corresponding to the physical antennas of the MIMO operation. The force of the virtual antenna concept is that the UE behaves as if the signals present at the virtual antennas are the ones actually transmitted, although the physical antennas (120, 130) radiate something different. The legacy UE (not supporting MIMO) will only 'see' the virtual antenna 160. Whilst its signal will be transmitted on both physical antennas the UE receiver will act as if transmitted from one (the mapping between virtual and physical antennas is transparent for the user equipment). The configuration received by the legacy user is the same as in a single antenna transmission system, the user equipment is not configured for any form of transmit diversity at RRC level. The MIMO UE will see both virtual antenna 160 and virtual antenna 170 and is unaware of the mapping between the virtual and physical antennas, which is transparent to the MIMO operation.

The four weights from the VAM matrix are differentiated by phases only as equal amplitude is required to achieve power balancing between the two physical antennas 120, 130. A first power amplifier 140 and a second power amplifier 190 are configured for amplifying the output signals after the VAM function before they are radiated by the physical antennas 120,130. The weights of the VAM matrix are fixed. They are configured for the whole cell and set by Operation & Maintenance (O&M) and typically not changed very often. The VAM weights fulfil totally different objectives than the MIMO precoding weights—the latter ones being variable weights (that can change every 2 ms) used only for the purpose of the MIMO transmission whilst VAM applies to all channels and has as objective to fulfil the two requirements highlighted above.

A pure SIMO mode can be also seen as a particular case of the VAM application, where the second virtual antenna has zero values in the matrix so that the same signal from the primary virtual antenna is mapped on the two antennas but with a given phase offset (that is $\omega_3=\omega_4=0$)

From the legacy user point of view the VAM technique is like a single antenna transmission, i.e. the user terminal demodulates the HSDPA signal as if there were no Transmission diversity in the system. Seen from the transmit side for legacy non-MIMO users, VAM amounts to transmitting the same signal (common channel, Rel'99 and HSDPA non-MIMO) on the two transmit antenna ports but with a different phase.

However, from extensive field testing of VAM functionality (measurements over a large amount of static points which statistically shows the impact of VAM), the following results have been obtained:

When there is no concurrent HSDPA and active MIMO user equipments e.g. only HSDPA (non-MIMO) user equipments in the cell, VAM has little or no impact on HSDPA performance i.e. throughputs observed of HSDPA user equipments with VAM active are nearly the same as the throughputs of HSDPA without VAM (single antenna transmission as in most 3G networks today).

The performance of MIMO with VAM is also very similar to the performance of MIMO with Tx diversity (STTD).

However whenever there is concurrent HSDPA and MIMO traffic, it has been observed that the performance of HSDPA legacy devices is impacted negatively by around 10% for a legacy type 3 device (Rx diversity and equalizer implemented in receiver) and by around 15-20% for a legacy type 2 HSDPA device (no Rx diversity, only equalizer implemented in receiver) whenever the secondary pilot is present in the second virtual antenna and more degradation is observed whenever the MIMO user is fully active with continuous downloads.

Hence, it is shown that even though the VAM technique has a better performance than previously used techniques such as STTD, it has still a negative impact in HSDPA legacy devices when there is concurrent HSDPA and MIMO traffic.

Enhanced Virtual Antenna Mapping (as disclosed in copending European patent application having application number EP 10382262.3) is a technique which allows enhancement of the VAM performance, improving the user throughput for all HSDPA users wherever deployed in a cell with dual Passive Antennas. The E-VAM solution has been designed and optimized for Macro and Radio Remote Head type deployments.

This latter technique alone lacks flexibility to permit adjustment of the transmit polarization and is somewhat limited, especially in a multiuser scenario.

There is therefore a need for transmission schemes which further improve the performance (especially for legacy HSDPA devices in concurrent HSDPA-MIMO traffic and in a multiuser scenario).

SUMMARY OF THE INVENTION

The current invention solves the aforementioned problems by disclosing a transmission system and method for use in a mobile telecommunication network, which improves the performance of prior art solutions.

It increases the throughput by obtaining extra degrees of flexibility in the resulting transmit polarization, achieving finer realisation of polarisations hence higher throughput (especially for HSDPA users), improving at the same time the performance of legacy HSDPA devices, above all in cells with HSDPA and MIMO traffic (e.g. when both technologies sharing the same carrier).

A key point is that this invention has been implemented in such a way not to have any dependency on 3GPP i.e. the feature would be supported by any legacy HSPA UE once implemented in active antennas.

The present invention may also be implemented in any wireless telecommunication network systems using active antennas regardless whether such systems operate in Single Input Multiple Output (SIMO) mode or Multiple Input-Multiple Output (MIMO) mode. In other words the present invention can be applied in either SIMO or MIMO modes of operation of the network.

According to a first aspect of the invention, a transmission system comprising an active antenna arrangement, is provided for use in a mobile communication network, the active antenna arrangement comprising:

S pairs of radiofrequency sub-modules, where S is a whole number greater than one, the radiofrequency sub-modules operating for transmission of radiofrequency signals to users of the mobile communication network, each radiofrequency sub-module including a first phase shifter module, a TRX module and a radiating antenna element, an active antenna controller which feeds a first radio signal to a given one of the sub-modules of each pair of sub-modules and a second radio signal to the other sub-module of each pair of sub-modules, where the first radio signal is the same for all the pairs of sub-modules and the second radio signal is the same for all the pairs sub-modules, wherein, for each pair of sub-modules, the radiofrequency sub-module receiving the second radio signal further comprises a second phase shifter module for adding a dynamic phase offset to the transmitted signal, and wherein the active antenna controller is configured to select a dynamic phase offset vector, according to the signal quality received by users of the mobile communication network, said dynamic phase offset vector being the set of S dynamic phase offsets corresponding to respective pairs of radiofrequency sub-modules.

According to a second aspect of the invention, a transmission method is provided for operating an active antenna arrangement for use in a mobile communication network, the active antenna arrangement comprising S pairs of radiofrequency sub-modules, the radiofrequency sub-modules operating for transmission of a radiofrequency signal to users of the mobile communication network, where S is a design parameter being S>1, each radiofrequency sub-module including a first phase shifter module, a TRX module and a radiating antenna element, the method comprising the following steps:

An active antenna controller feeding with a first radio signal to one of the sub-modules of each pair of sub-modules and with a second radio signal to the other sub-module of each pair of sub-modules, where the first radio signal is the same for all the pairs of sub-modules and the second radio signal is the same for all the pairs sub-modules, In each pair of sub-modules, adding a dynamic phase offset to the radiofrequency sub-module receiving the second radio signal, The active antenna controller selecting a dynamic phase offset vector according to the signal quality received by the users of the mobile communication network said dynamic phase offset vector being a set of S dynamic phase offsets corresponding to respective pairs of radiofrequency sub-modules.

In an exemplary embodiment for the selection of the dynamic phase offset vector includes the following steps:

a) Selecting a set of candidate dynamic phase offset vectors b) Transmitting radiofrequency signals to users of the mobile communication network, applying each one of the phase offset vectors from the set of candidate phase offset vectors c) Measuring the quality received by the users of the mobile network corresponding to each candidate phase offset applied; and d) Selecting from among the set of candidate dynamic phase offset vectors, a dynamic phase offset vector to be applied as a function of the measured quality and a given optimisation criterion.

The set of candidate dynamic phase offset vectors may be selected from a predefined group of phase offset vectors.

In an exemplary embodiment the set of candidate dynamic phase offset vectors is selected by sampling the full phase offset range, so the selected phase offset vectors have maximum decorrelation between each others. That can be made by selecting equally spaced vectors, that is, vectors which have equal distance (e.g. Euclidean distance) between each other.

In an alternative embodiment, the set of candidate dynamic phase offset vectors is selected by, for one of the S dynamic offsets of the vector sampling the full phase offset range by given steps of $\Delta\theta$ degrees and assigning a fixed value to the rest of offsets of the vector, where $\Delta\theta$ is a design parameter. Optionally, this may be done for each one of the S dynamic offsets of the vector.

In an alternative embodiment, the set of candidate dynamic phase offset vectors is selected by dividing the S dynamic phase offsets of the dynamic phase offset vector into a defined number of sub-groups, assigning the same phase offset value for all the phase offsets within the same sub-group and, for each sub-group, sampling independently from other sub-groups the full phase offset range by given steps of $\Delta\theta$ degrees, where $\Delta\theta$ is a design parameter.

The optimization criterion may consist of selecting from among the set of candidate dynamic phase offset vectors the dynamic phase offset vector which maximizes the equation $$\frac{1}{L} \cdot \sum_{i=1}^{L} CQI_i \cdot \omega_i$$

where $\omega i$ is the weight associated to user i, $CQI_i$ corresponds to the CQI (channel quality information) reported by user i when receiving transmission signals transmitted applying a given dynamic phase offset vector and L is the number of users considered.

Optionally, only quality information reported by HDSPA user equipments is taken into account for the phase selection.

In an exemplary embodiment, the mobile communication network uses the multiple input, multiple output MIMO functionality and the first and second radio signals are MIMO signals and/or the dynamic phase offset vector is selected to maximize the throughput received by the legacy HSDPA user equipments.

In an exemplary embodiment, a Virtual Antenna Mapping technique is used to balance the power between the sub-modules of each pair of sub-modules.

Optionally, the active antenna controller performs the dynamic phase offset selection periodically during the duration of a communication session and additionally triggered when there is a new call setup or any other specific event which leads a data user to be in active mode.

In a third aspect of the invention, a network element is provided, incorporating the active antenna arrangement according to any of the above mentioned embodiments, where optionally the network element is a Node B.

Finally, a computer program product comprising computer program code adapted to perform the method according to claim 12 when said program code is executed on a computer, a digital signal processor, a field-programmable gate array, an application-specific integrated circuit, a microprocessor, a micro-controller, or any other form of programmable hardware.

For a more complete understanding of the invention, its objects and advantages, reference may be made to the following specification and to the accompanying drawings.

BRIEF DESCRIPTION OF THE DRAWINGS

For the purpose of aiding to better understand the characteristics of the invention according to a preferred practical embodiment thereof and in order to complement this description, the following figures is attached as an integral part thereof, having an illustrative and non-limiting character.

DETAILED DESCRIPTION OF THE INVENTION

The method and system hereby described can be applied, for example, to UMTS 3G mobile networks but other types of networks and systems are not excluded. The skilled addressee will appreciate that the method and system may be adapted to networks using any wireless transmission technology including: networks using 2G radio access technology (GSM, GPRS, EDGE etc.), 3G Technology (UMTS, HSDPA, HSUPA, etc.), 4G LTE (Long Term Evolution), as well as WIMAX With the conventional VAM technique the additional phase difference introduced by the transmission chain after the baseband processing is not controlled. Even though statistically the effect of VAM (without any concurrent MIMO traffic) is close to null when compared to not using VAM (single Tx antenna system) this inherent phase difference has a strong impact on the performance of legacy HSDPA devices. Bearing in mind the above results obtained, the VAM performance can be improved by making sure the phase difference between the two transmit chains is adjusted dynamically in such a way to provide the best performance in the cell, for example considering all HSDPA user equipments.

Figure 1:
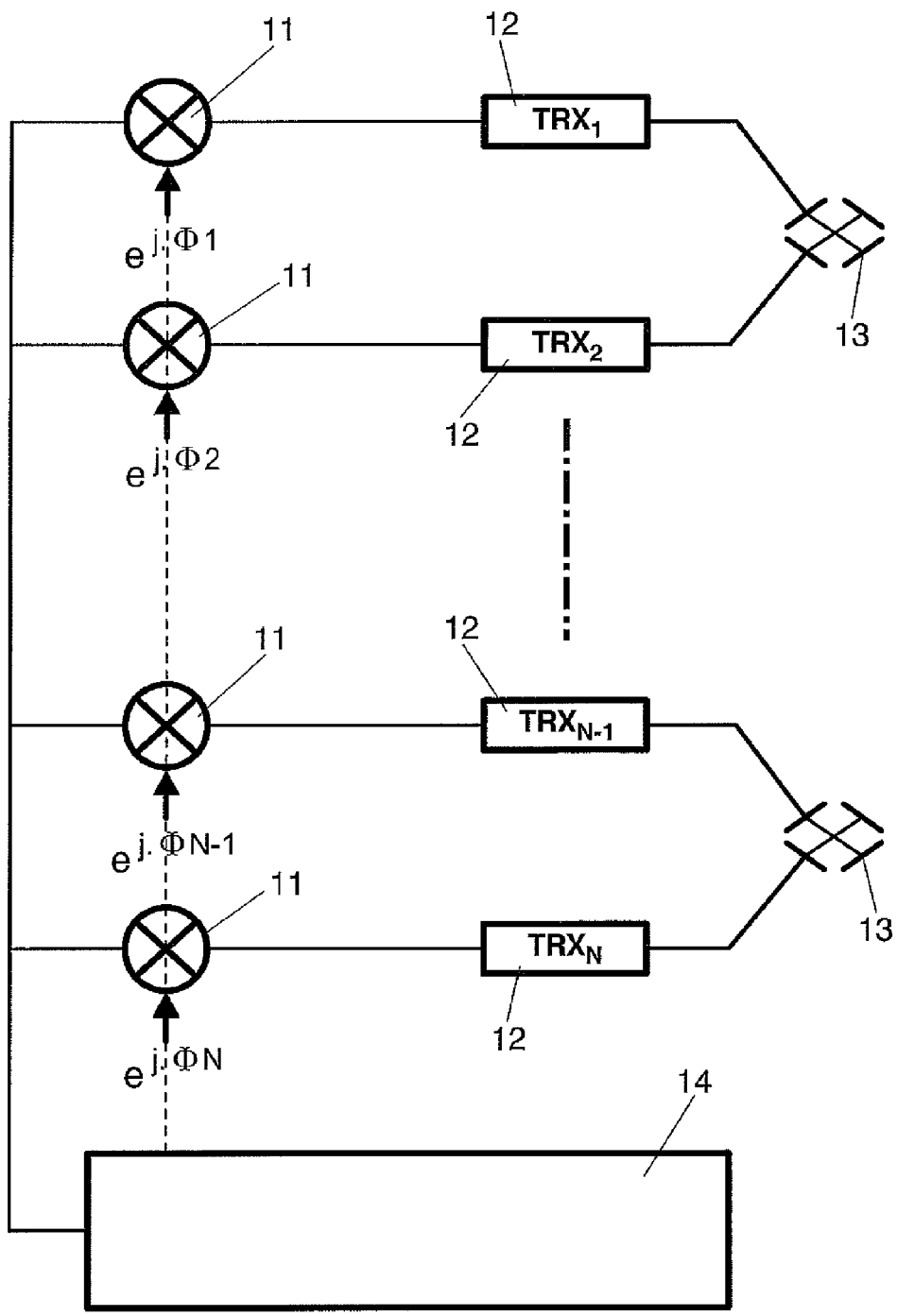
FIG. 1 shows an active antenna architecture according to a prior art embodiment

Furthermore, in multiple active antennas, due to the fact that they have a multiplicity of RF sub-modules as seen in FIG. 1 (usually between 16-20 sub-modules but any other number of sub-modules is possible), instead of dynamically optimizing a single phase offset it is possible to adjust and optimize a multiplicity of phase offsets (e.g. 1 phase offset per pair of RF sub-modules) which permits multiple polarizations in a single Cross Polarize Base Station antenna, while the prior art solutions only allow one polarization to be transmitted at each time). This entails more flexibility in the adjustment of the transmit polarization which allows to achieve higher throughput especially in multiuser conditions. That is, each phase offset permits transmission on a pair of sub-modules with a given polarisation. So in principle if we have 8-10 phase offsets e.g. 16-20 sub-modules, we can transmit with 8-10 different polarisation assuming that the algorithm looks for optimum independent phase offsets (e.g. using old E-VAM solution you have only 1 transmit polarisation as all offsets would be equal).

Figure 3:
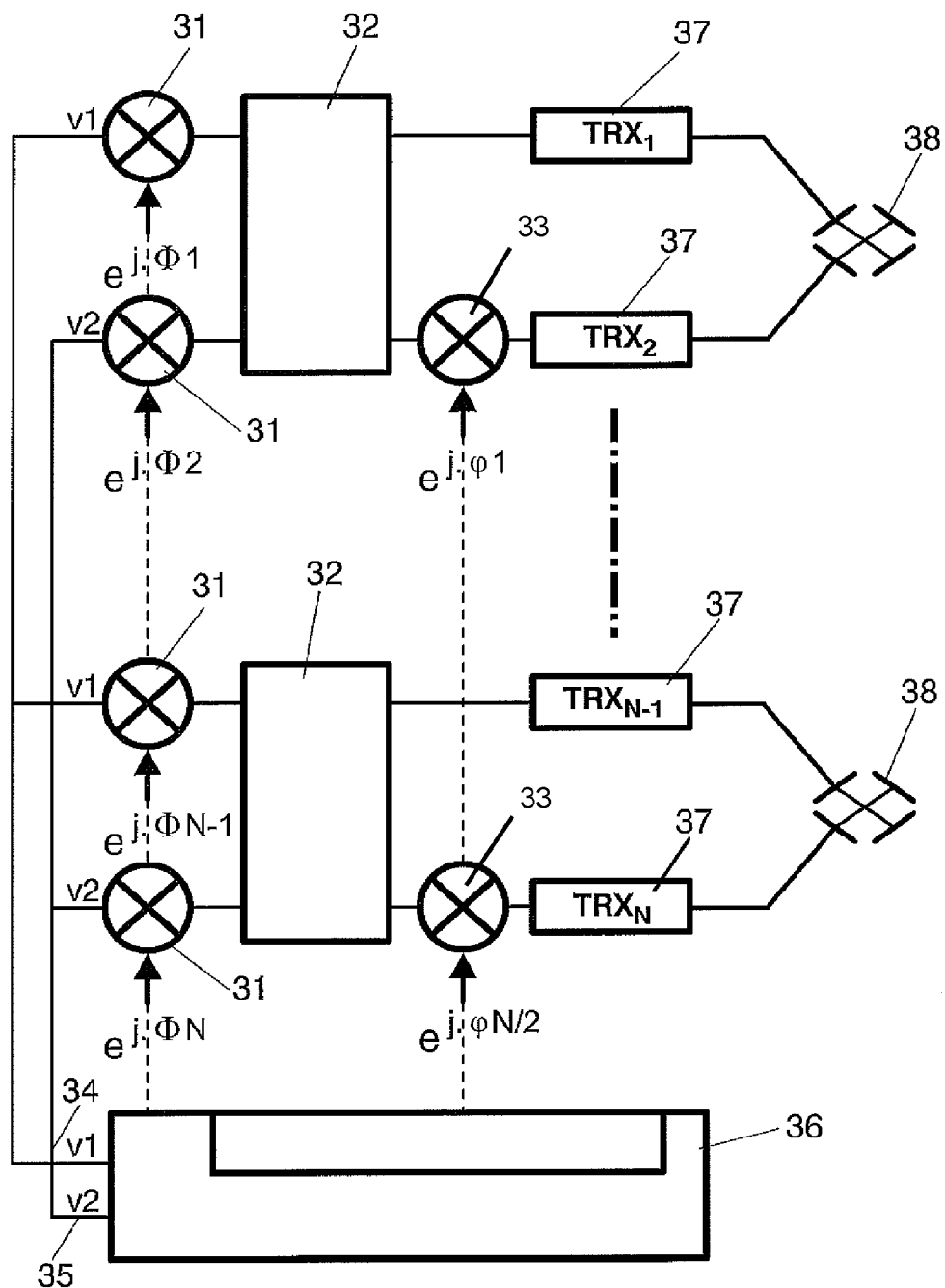
FIG. 3 shows a block diagram of an exemplary embodiment of the present invention.

In an exemplary embodiment, the multipolarization solution disclosed in the present invention is implemented according to the block diagram presented in FIG. 3. This configuration is ready for MIMO operation however for non-MIMO users the transmission is seen as a SIMO transmission (UE is not aware of the multiple antenna transmission in E-VAM and acts as if it were a single antenna transmission). SIMO+MIMO operation is allowed, so this configuration can either be used in a SIMO or MIMO cell.

Figure 2:
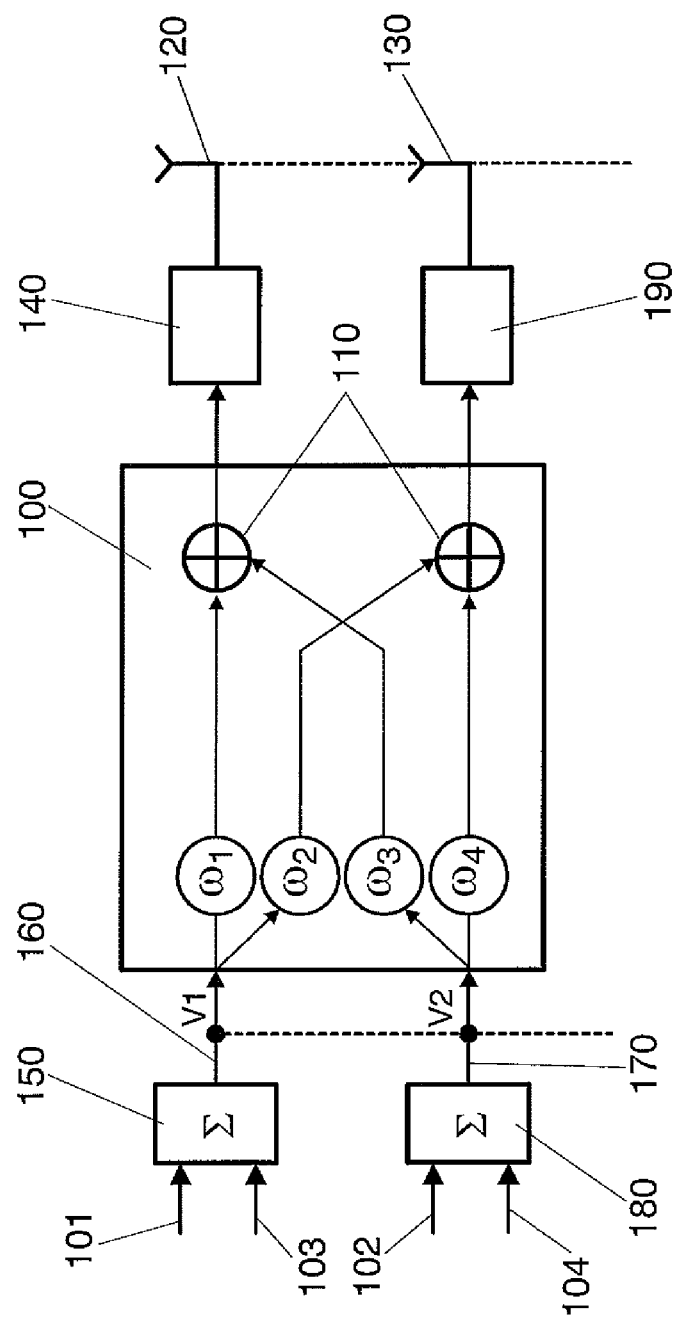
FIG. 2 shows an exemplary embodiment of the prior art VAM technique.

As it can be seen in FIG. 3, a VAM technique is used in every pair of sub-modules. In each pair of sub-modules, one of them is feed with a transmission signal v1 (34) and the other one with a transmission signal v2 (35) (v1 and v2 may be for example the transmission signals 160 and 170, shown in FIG. 2, each one being the addition of a MIMO stream and a pilot signal).

Then a static phase offset (31) (as explained above, used for antenna calibration and usually not changed during all the antenna operation) is applied to each signal, and after the VAM module (32), a second phase offset (33) (which may be different for each pair of sub-modules, represented by $e^{j\cdot\phi 1} \ldots e^{j\cdot\phi N/2}$) is applied to one of the sub-modules of the/each pair of sub-modules.

Said second phase offsets are called "dynamic" phase offsets (or also adaptive phase offsets) because they are changed dynamically to be adapted to the specific radio conditions i.e. as opposed to the static phase offset which is used for tilting (changed very seldom when optimising the cell as explained before). Said dynamic phase offset are selected by the active antenna controller element (36), usually applying an offset selection algorithm.

The rest of blocks shown on FIG. 3 have the same functions as the blocks on FIG. 1, that is transceiver (TRX) modules (37) and antenna elements (38).

In an exemplary embodiment, the solution presented in FIG. 3 is be introduced and controlled in a Node B (or an analogous network entity such as an eNode B or BTS).

The algorithm for the selection or generation of the adaptive/dynamic phase offset vector (the vector formed by the phase offsets dynamically assigned to each pair of sub-modules or in other words, the set of S values of dynamic phase offsets, each value corresponding to the value assigned to the dynamic phase offset of each pair of sub-modules), must be designed with the aim of maximizing performance and minimizing (computational) overhead. The algorithm can, for example, rely on the CQI feedback information in the decision process determining what phase offset vector is applied. The algorithm can be divided into two parts or steps:

Phase scan: In this stage, different phase offset vectors are used to sample the phase range with a certain granularity, measuring the relevant channel quality metrics (preferably CQI but also, CPICH RSCP, and/or Ec/N0 or any other quality metric available) when transmitting a signal with each phase offset vector, in order to provide average quality measurements corresponding to each phase offset vector sampled to the algorithm. In a preferred, embodiment the quality measurements are the CQI or any other measurements reported by the users in their normal operation. This reuse of the measurements allows that this solution is supported by any user without any modification, so the solution can be implemented in a seamless way without requiring any modification in the terminals. Out of these metrics the CQI is the most important as reported every 2 ms whilst the others are only available on a slow basis (hundreds of ms). The selection of the phase offset vector to be applied for the cell is made as a function of the channel quality for each user (preferably only HSDPA user equipments are taken into account) and a given optimisation criterion (cell tput, user tput, QoS)

Phase application: In this stage, the phase offset vector selected by the algorithm will be applied continuously.

In other words, the selection of the phase offset vector is achieved by performing a phase offset scan across the full range of phase offsets with a certain granularity. During the phase offset scan, the CQI indication from each user is recorded each time a new phase offset is applied in order to identify the optimum phase according to the desired criterion (e.g. maximization of HSDPA user throughput).

Figure 4:
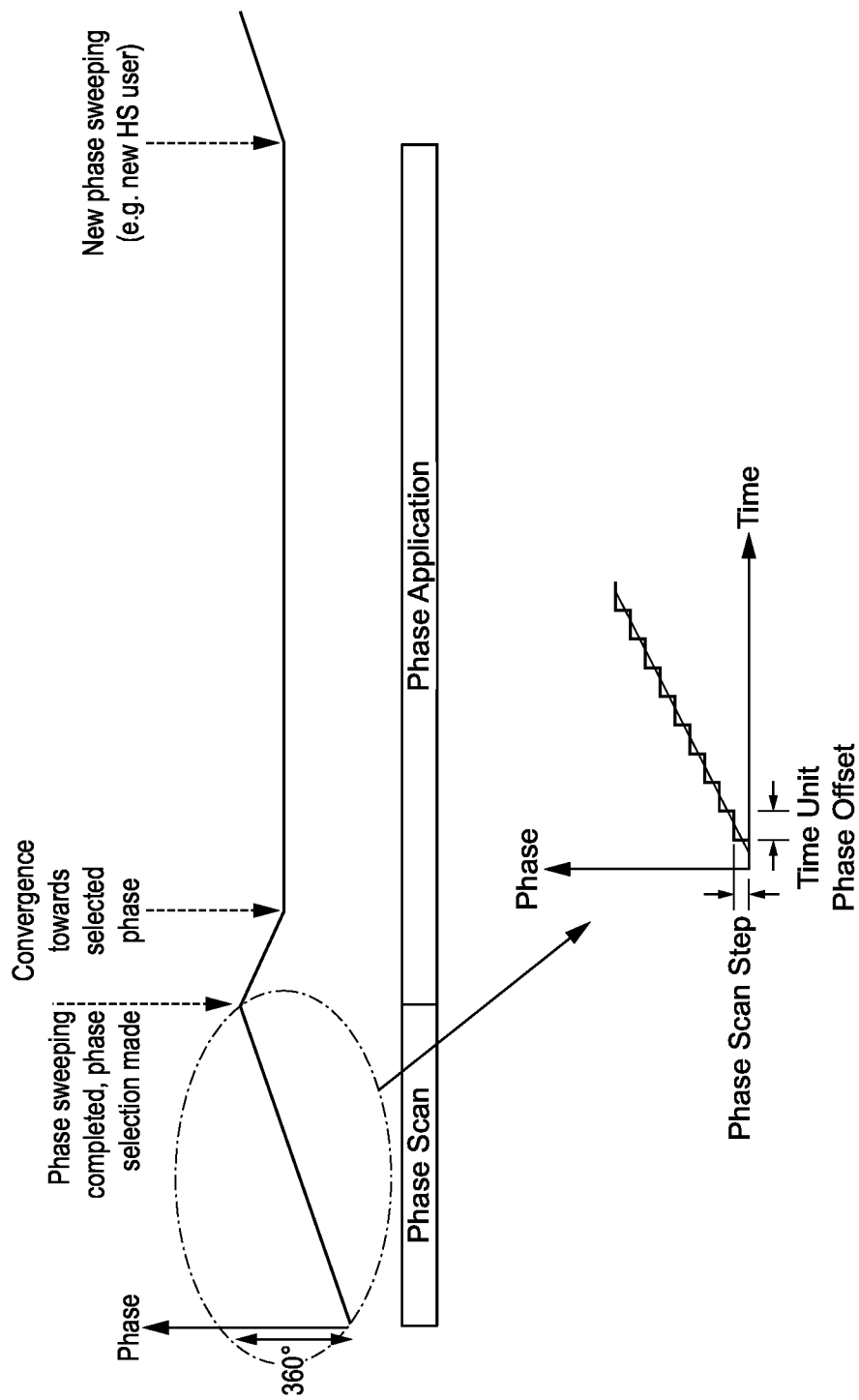
FIG. 4 shows an illustrative scheme of the phase adaptation process when only one phase offset is scanned.

These steps are illustrated in FIG. 4 (to explain more clearly the concepts, FIG. 4 only shows a single phase offset but these steps apply to the rest of phase offsets to be selected).

But, for an active antenna, if said scan is made for each possible phase vector value, that is, for each combination of phase offsets of each of the pair of sub-modules involved, that will make the scan period too long, which would reduce drastically the benefits of this solution.

For example, assuming the 360° range is "quantized" into 12 values (30° step) each module would have 12 different phase steps to try, we have 8 sub-modules (4 phase offsets, 1 per sub-module pair) there would be 12^4 (20736) different phase vectors possible which is prohibitive (as a complete scan would typically take around 200 seconds).

Today in a more practical implementation, the phase scan should ideally last less than 100 ms (e.g. around 10 ms per phase value), this is important as many packet calls (for example, from Smartphones) have short duration hence the smaller the phase scan the more benefits we get for this type of calls.

This problem is solved in the present invention by adopting a new phase scan procedure.

The first, basic, approach that can be taken is to perform a single phase scan using at each time instant the same phase offset (PO) on each pair of sub-modules, that is, $PO_1=PO_2=PO_3=\ldots=PO_S$ (where S is the number of pairs of sub-modules). In this case, there is no issue of overhead but no additional gain from the extra flexibility with the additional phase offsets. So this solution is not applied in the present invention.

The following approaches are taken in the present invention to solve the phase scan issue. To illustrate these different approaches let's take the example of an active antenna made of N sub-modules structured in S=N/2 dual RF modules i.e. in total S=N/2 phase offsets can be adapted in the transmission, there being a number M of possible offset values (that is, the number of phase values used to sample the 360° range):

1. In an exemplary embodiment, the phase scan is performed by going through a defined set of potential (candidate) phase offset vectors in one go, the defined set of potential phase offset vectors is a subset of the set of all possible phase offset vectors and is selected by the algorithm to allow for a reduced time scan. In our example instead of scanning all 256 phase vectors, we could select 16 phase vectors, selecting the vectors covering the full phase vector range optimally. In principle we should sample the vector space with equal "distance" between the 16 selected vectors resulting in 16 vectors with maximum decorrelation between each others. To calculate the distance between the vectors, any type of geometric distance definition could be used, for example the Euclidean distance. This would be help reducing the overhead of the algorithm as covering the full range can easily become prohibitive in terms of overhead as the phase scan time would be too long vs.

the application time. By simulations and field measurements the set of vectors to use can be optimized.

Figure 5:
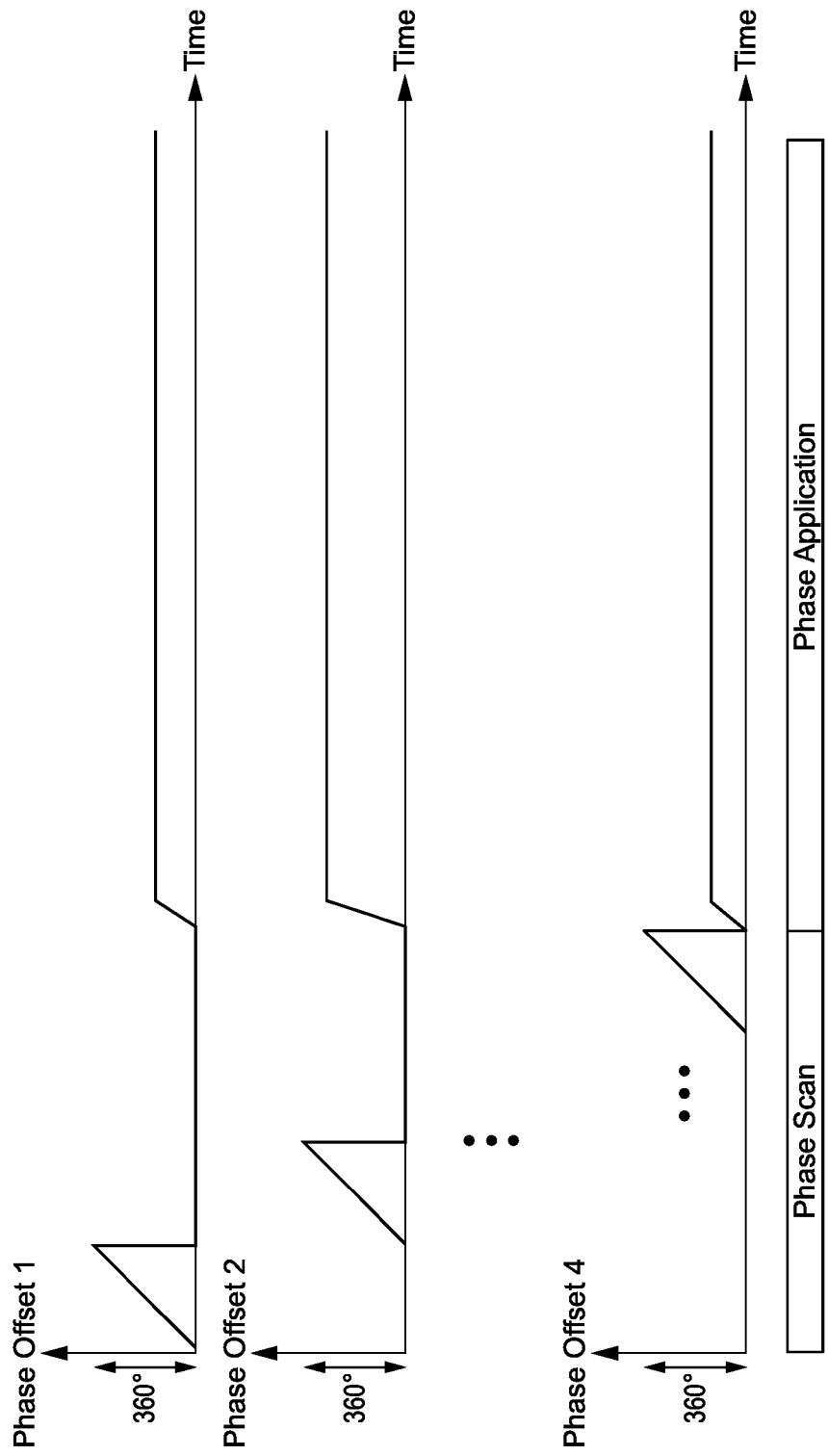
FIG. 5 shows an illustrative scheme of the phase adaptation process in one embodiment of the present invention.

2. In an exemplary embodiment, the phase scan is performed for each pair of sub-modules individually in sequence (FIG. 5). In this approach, the value of one of the phase offsets is scanned in the whole range while the rest of the offsets have a fixed value (0 in the case shown in FIG. 5). Optionally, this is repeated for each one of the phase offsets (that is, for each one of the pair of sub-modules). This approach is a simplified approach to minimize the number of phase vectors in the phase scan hence reducing the overhead of the scheme. Instead of going through all possible phase vectors i.e. M^S phase vectors (if M=4 and S=4, 4^4=256 phase vectors) only M*S phase vectors would be used in the phase scan (4*4=16 in our example). As will be seen later, in order to derive a phase vector that will be applied the algorithm will have as an input, average CQI achieved for the best value for each phase offset. From here the algorithm can use the best value for each phase offset to form the optimum phase offset vector (e.g. maximizing average CQI).

3. In an exemplary embodiment, the phase scan is performed putting the phase offsets into groups, with a reduced number of phase offset values to reduce the number of phase vectors, reducing therefore the phase scan time. The scan is done simultaneously for the different phase offsets within one group and sequentially between different groups. If grouping, for example, the phase offsets in pairs (that is, $PO_1=PO_2$, $PO_3=PO_4$) instead of scanning 256 phase vectors this would allow to scan 4^2 i.e. 16 phase vectors (in the example of S=4 and M=4). The groups can be changed in different phase scan instances, the phase offsets can alternatively be grouped by consecutive modules or by interleaving them (e.g. $PO_1=PO_2$ and $PO_3=PO_4$, or $PO_1=PO_3$ and $PO_2=PO_4$).

As explained before, in all cases, usually the criterion used to decide on the phase vector to apply depends on the quality measured for the different phase vectors. For example, the phase vector maximizing the average CQI will be selected as an output of the phase scan.

One possible criterion to be applied is the Maximum HSDPA aggregated user throughput. This criterion consists in selecting the phase offset which maximizes equation (1)

$$\frac{1}{L} \cdot \sum_{i=1}^{L} CQI_i \cdot \omega_i \quad (1)$$

Where $\omega_i$ is the QoS weight associated to user i (if QoS is not applied then all weights are equal to 1 by default), $CQI_i$ corresponds to the average CQI reported by user i (channel quality information) over the time period where the phase offset is applied and L is the number of users considered. This equation is applied to the different phase offset scanned and the phase offset for which the result if highest (highest CQI averaged across users) is selected.

This phase offset is applied at cell or sector level (i.e. applicable to all channels, all services), hence when there is more than one user in the cell, there is a trade-off to be found in order to maximize the throughput of the active legacy HSDPA user equipments. The phase applied can be optimized specifically for the HSDPA user equipments (as opposed to MIMO users), the MIMO user would then remain with same performance as today whilst HSDPA user equipments will see their throughput increase. In an exemplary embodiment, the CQI information from the MIMO users are ignored through either a weight equal to 0 or simply not considering MIMO users in the above equation), only CQI reports from the HSDPA user equipments are taken into account in the selection of the phase offset to apply after the phase scan. For example in the critical scenario highlighted above where there was one active HSDPA user and one active MIMO user in the cell, the Node B would select the phase that will maximize HSDPA performance (in presence S-CPICH and MIMO second stream if active) i.e. only taking into account the CQI reports from the HSDPA user. Highly mobile HSDPA user equipments can be discarded as well in the phase selection process (e.g. through CQI filtering) as for these users the benefit of the phase adaptation is small whilst resulting in worsened performance for HSDPA static user equipments.

As there are typically many HSPA users connected simultaneously to a cell and only one phase vector can be applied at one point in time, it is important to focus the phase scan on active users. It is frequent to have scenario where a large number of users are connected with an HSPA RAB setup but with no or low amount of data to transmit. Therefore the phase scan should also discard inactive users (or "insufficiently active" users) to make sure the best phase vector is selected. A simple way to do this is to monitor the amount of data transmitted to each user over a certain period (for example the last phase application period) and set a minimum threshold to be considered as active for this purpose e.g. assuming a phase scan lasting 100 ms users are considered active if transmitting more than 6400 bits.

In an exemplary embodiment, the phase scan should typically last 100-200 ms (depending on the number of phase vectors scanned) and should be performed every 2 or 4 seconds (phase scan should remain around 5% of phase application time to minimize the overhead from this procedure). The phase scan should be done periodically and can also be performed any time a new user performs a call setup.

Generally speaking, in order to get maximum benefits, the phase scan should be done only when necessary. For example this phase scan could be made:
  Periodically during the duration of the HSDPA session (to have updated channel quality information)
  When there is a specific event (e.g. when there is a drop in the CQI average across all HSDPA user equipments).
  When a new user (preferably an HSDPA user equipments) is active (that is when there is a new Radio Access Bearer, RAB, establishment). To do that, if RRC idle states are in use in the cell, the U-RNTI (UTRAN Temporary Identifier) or any identification of the user should be memorized in order not to repeat the phase scan for the same user.

Combinations of these three criteria are also possible (e.g. when there is a call set-up and periodically).

Figure 6:
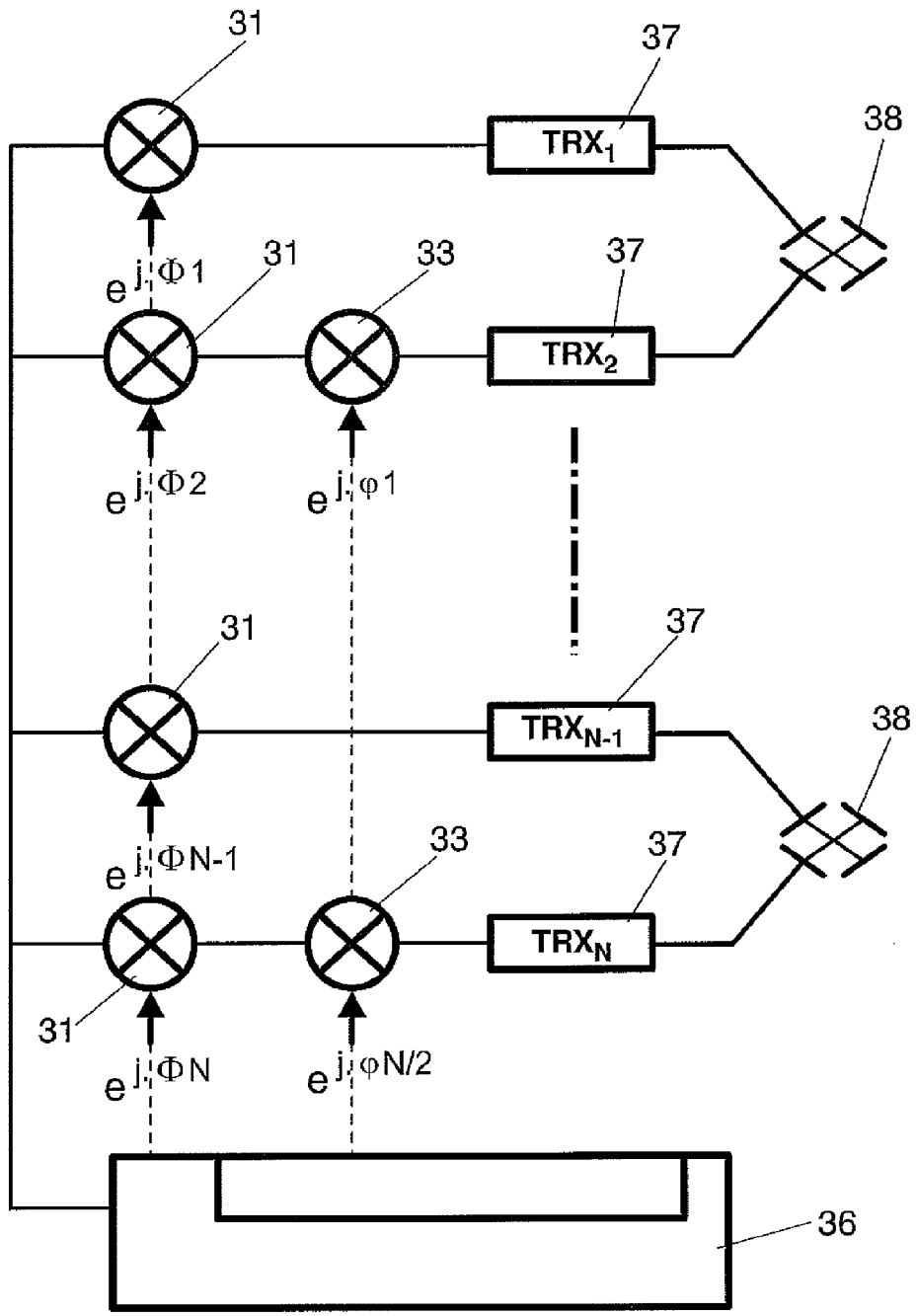
FIG. 6 shows an illustrative scheme of the phase adaptation process in another embodiment of the present invention.

The present invention may also be used in a scenario where only SIMO operation is allowed, as it can be seen as a particular case of the embodiments presented. VAM can be seen as a 4×4 complex matrix which allows both MIMO and SIMO operation. In SIMO mode, two values of the matrix are set to 0 ($\omega_3=\omega_4=0$). In other words basically in SIMO mode E-VAM just replicates the same signal on the two antennas but with a given phase offset (selected in the same way as disclosed above). This particular scenario is shown in FIG. 6.

Of course, alternative approaches can be taken for the phase adaptation.

Summarizing, Active Antennas are key elements in the future of mobile networks, it can be expected that in a number of years that active antennas will be the default solution for Node B deployments. Standard VAM solutions can be applied to active antennas to improve HSPA performance, now with active antennas several phase offsets can be further exploited to further increase throughput by making the most of the extra degrees of flexibility in the resulting transmit polarisation.

The key difference with prior art solutions is that this solution will permit to achieve finer realisation of polarisations hence higher HSDPA throughput and will allow to differentiate active antenna deployments from conventional Node B deployments with stronger downlink performance.

A key point is that this invention has been implemented in such a way not to have any dependency on 3GPP i.e. the feature would be supported by any legacy HSPA UE once implemented in active antennas. That is, the invention has been designed in such a way to be working seamlessly with HSDPA. This is obtained, for example, by reusing the existing CQI signalling supported by any HSDPA user without any modification, to decide the relevant phase offset vector to apply (vector maximising the average CQI signalling of the active users). This is key for an operator as this solution can be applied to all HSPA users in the network. The terminal penetration is often slowing down deployments of new technologies typically requiring new terminals, here the dependency is only on the network side.

This solution allows as well the introduction of the MIMO HSDPA functionality into the network in as seamless a way as possible for legacy HSDPA user(s), with performance degradation minimized due to either the Secondary Common Pilot Channel or interference from the second virtual antenna.

The matters defined in this detailed description are provided to assist in a comprehensive understanding of the invention. Accordingly, those of ordinary skill in the art will recognize that variation changes and modifications of the embodiments described herein can be made without departing from the scope of the invention. Also, description of well-known functions and elements are omitted for clarity and conciseness.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method, implemented at a computer system that includes one or more processors, for selecting a phase offset vector used in a virtual antenna mapping arrangement in a mobile communications network, the method comprising:
   identifying an existing phase offset vector that is determined to be in need of an update, wherein the existing phase offset vector is being used by a plurality of radio-frequency branches;
   identifying a number of possible replacement phase offset vectors;
   generating a subset of phase offset vectors from among the identified possible replacement phase offset vectors;
   transmitting a plurality of radio-frequency signals to one or more user devices of the mobile communications network, wherein each transmitted radio-frequency signal was acted upon by at least one phase offset vector included in the subset of phase offset vectors;
   in response to transmitting the plurality of radio-frequency signals, receiving signal quality information from the one or more user devices; and
   based at least partially on the received signal quality information, selecting, from among the subset of phase offset vectors, a particular phase offset vector to replace the existing phase offset vector.

2. A method in accordance with claim 1, wherein the number of possible replacement phase offset vectors is at least partially based on how many radio-frequency branches are included within the plurality of radio-frequency branches.

3. A method in accordance with claim 1, wherein the received signal quality information includes Common Pilot Channels (CPICH).

4. A method in accordance with claim 1, wherein the received signal quality information includes at least one of the following: Common Pilot Channels (CPICH), Channel Quality Information (CQI), RSCP, or Ec/N0.

5. A method in accordance with claim 1, wherein the received signal quality information is based only on CQI reports from HSDPA user devices.

6. A method in accordance with claim 5, wherein the received signal quality information is not based on information received from highly mobile HSDPA user devices.

7. A method in accordance with claim 1, wherein the received signal quality information is based on information sent only by active user devices.

8. A method in accordance with claim 7, wherein a user device is determined to be an active user device by performing the following:
   monitoring an amount of data transmitted to the user device over a determined time period, and
   comparing the monitored amount of data against a threshold value.

9. A method in accordance with claim 1, wherein the existing phase offset vector is determined to be in need of the update when one or more of the following conditions are present:
   an established time period has elapsed;
   a pre-determined event has occurred; or
   a new user device is active.

10. A computer system, comprising:
   one or more processors; and
   one or more computer-readable hardware storage devices having stored thereon computer-executable instructions that are executable by the one or more processors to cause the computer system to select a phase offset vector that is used in a virtual antenna mapping arrangement in a mobile communications network by at least causing the computer system to perform the following:
     identify an existing phase offset vector that is determined to be in need of an update, wherein the existing phase offset vector is being used by a plurality of radio-frequency branches;
     identify a number of possible replacement phase offset vectors;
     generate a subset of phase offset vectors from among the identified possible replacement phase offset vectors;
     transmit a plurality of radio-frequency signals to one or more user devices of the mobile communications network, wherein each transmitted radio-frequency signal was acted upon by at least one phase offset vector included in the subset of phase offset vectors;

in response to transmitting the plurality of radio-frequency signals, receive signal quality information from the one or more user devices; and based at least partially on the received signal quality information, select, from among the subset of phase offset vectors, a particular phase offset vector to replace the existing phase offset vector.

11. A computer system in accordance with claim 10, wherein the number of possible replacement phase offset vectors is at least partially based on how many radio-frequency branches are included within the plurality of radio-frequency branches.

12. A computer system in accordance with claim 10, wherein the received signal quality information includes Channel Quality Information (CQI).

13. A computer system in accordance with claim 10, wherein the received signal quality information is based only on CQI reports from HSDPA user devices.

14. A computer system in accordance with claim 13, wherein the received signal quality information is not based on information received from highly mobile HSDPA user devices.

15. A computer system in accordance with claim 10, wherein the received signal quality information is based on information sent only by active user devices.

16. A computer system in accordance with claim 10, wherein the selection of the particular phase offset vector to replace the existing phase offset vector is not dependent on 3GPP.

17. A computer system in accordance with claim 10, wherein the received signal quality information is Channel Quality Information, and wherein, prior to selecting the particular phase offset vector, the Channel Quality Information is filtered.

18. A computer system in accordance with claim 10, wherein transmitting the plurality of radio-frequency signals to the one or more devices and receiving the signal quality information from the one or more user devices lasts less than 100 ms.

19. A computer system in accordance with claim 10, wherein the existing phase offset vector and the particular phase offset vector that is to replace the existing phase offset vector each comprises one or more phase offsets.

20. A computer program product comprising one or more computer-readable hardware storage devices having thereon computer-executable instructions that are executable by one or more processors of a computer system to cause the computer system to select a phase offset vector used in a virtual antenna mapping arrangement in a mobile communications network by at least causing the computer system to perform the following:

identify an existing phase offset vector that is determined to be in need of an update, wherein the existing phase offset vector is being used by a plurality of radio-frequency branches in a virtual antenna mapping arrangement, wherein the existing phase offset vector includes one or more phase offset values each of which samples a 360-degree range, and wherein each radio-frequency branch includes a first phase shifter, a transceiver, and an antenna;

identify a number of possible replacement phase offset vectors;

generate a subset of phase offset vectors from among the identified possible replacement phase offset vectors;

transmit a plurality of radio-frequency signals to one or more user devices of the mobile communications network, wherein each transmitted radio-frequency signal was acted upon by at least one phase offset vector included in the subset of phase offset vectors;

in response to transmitting the plurality of radio-frequency signals, receive signal quality information from the one or more user devices; and based at least partially on the received signal quality information, select, from among the subset of phase offset vectors, a particular phase offset vector to replace the existing phase offset vector.

* * * * *